United States Patent
Gustavsson et al.

(10) Patent No.: US 10,191,988 B2
(45) Date of Patent: Jan. 29, 2019

(54) SYSTEM AND METHOD FOR RETURNING PRIORITIZED CONTENT

(71) Applicant: Sony Corporation, Tokyo (JP)

(72) Inventors: Jonas Gustavsson, Lund (SE); Anders Isberg, Åkarp (SE)

(73) Assignee: Sony Mobile Communications Inc., Tokyo (JP)

( * ) Notice: Subject to any disclaimer, the term of this patent is extended or adjusted under 35 U.S.C. 154(b) by 589 days.

(21) Appl. No.: 14/924,961

(22) Filed: Oct. 28, 2015

(65) Prior Publication Data

US 2017/0124196 A1    May 4, 2017

(51) Int. Cl.
G06F 17/30 (2006.01)
G06Q 30/02 (2012.01)
G06Q 50/00 (2012.01)

(52) U.S. Cl.
CPC .... G06F 17/30867 (2013.01); G06F 17/3053 (2013.01); G06F 17/30598 (2013.01); G06Q 30/0241 (2013.01); G06Q 50/01 (2013.01)

(58) Field of Classification Search
CPC .......... G06F 17/30867; G06F 17/3053; G06F 17/30598
See application file for complete search history.

(56) References Cited

U.S. PATENT DOCUMENTS

| | | | | |
|---|---|---|---|---|
| 8,108,414 B2* | 1/2012 | Stackpole | ........... | G06F 17/3087 707/758 |
| 8,108,501 B2* | 1/2012 | Birnie | .................... | H04W 4/02 709/223 |
| 2006/0085419 A1* | 4/2006 | Rosen | ................. | G06F 17/3087 |
| 2006/0090139 A1* | 4/2006 | Jenni | ................... | G06F 17/2241 715/760 |
| 2008/0294607 A1* | 11/2008 | Partovi | ................... | G06Q 30/00 |
| 2009/0063304 A1* | 3/2009 | Meggs | ................... | G06Q 10/06 705/26.62 |
| 2009/0112701 A1* | 4/2009 | Turpin | .................. | G06Q 30/02 705/7.33 |
| 2009/0228296 A1* | 9/2009 | Ismalon | ................ | G06Q 30/02 705/319 |
| 2010/0153324 A1* | 6/2010 | Downs | ............... | G06F 17/2745 706/21 |
| 2010/0299276 A1* | 11/2010 | Shahine | ................ | G06Q 10/10 705/319 |

(Continued)

OTHER PUBLICATIONS

International Search Report and Written Opinion from corresponding International Application No. PCT/US2016/029135, dated Jul. 14, 2016.

*Primary Examiner* — Kris E Mackes
*Assistant Examiner* — Tiffany Thuy Bui

(57) ABSTRACT

A prioritized list of items available via an electronic user device is provided to a user. The user has relations categorized in a social graph for which activity is crawled to detect interactive behavior with objects made by the relations via respective electronic devices. The prioritizing includes identifying items for the list; determining a relative level of the user's contextual affinity with one or more of the list items, contextual affinity to a list item characterized by connectedness of a context of the user's current use of the electronic user device to a manner in which a relation has had interactive behavior with one of the objects that corresponds to the list item; and ranking the list items according to the relative levels of affinity.

15 Claims, 4 Drawing Sheets

(56) References Cited

U.S. PATENT DOCUMENTS

| | | | |
|---|---|---|---|
| 2011/0004831 A1* | 1/2011 | Steinberg | H04N 21/454 715/753 |
| 2011/0029388 A1* | 2/2011 | Kendall | G06Q 30/02 705/14.66 |
| 2011/0161987 A1* | 6/2011 | Huang | G06Q 10/10 719/318 |
| 2012/0001919 A1* | 1/2012 | Lumer | G06F 17/30705 345/440 |
| 2012/0047129 A1 | 2/2012 | Redstone | |
| 2012/0110071 A1* | 5/2012 | Zhou | G06Q 10/10 709/204 |
| 2012/0166452 A1 | 6/2012 | Tseng | |
| 2012/0265704 A1* | 10/2012 | Buyukkokten | G06Q 30/02 705/319 |
| 2016/0191450 A1* | 6/2016 | Lineberger | H04L 51/32 709/206 |
| 2016/0210321 A1* | 7/2016 | Gong | G06F 17/30345 |

\* cited by examiner

SYSTEM AND METHOD FOR RETURNING PRIORITIZED CONTENT

TECHNICAL FIELD OF THE INVENTION

The technology of the present disclosure relates generally to electronic devices and, more particularly, to a system and method for improving the ranking of search results and the delivery of other content to a user.

BACKGROUND

A conventional way to rank Internet search results is to base the ranking on the number of inbound links to the pages identified by the search. The number of inbound links is used as an indicator of relative value of each search result hit. An exemplary search engine that prioritizes search results using inbound links is the GOOGLE search engine offered by Alphabet, Inc. of Mountain View, Calif. (formerly Google, Inc.).

Another common search that may be made is a search of a social media platform, such as the FACEBOOK social media site offered by Facebook, Inc. of Menlo Park, Calif. Search results returned by the FACEBOOK site are limited to the social media platform since information outside the platform is not indexed. Also, the results are ranked based on the user's social graph.

While the foregoing techniques have value in certain situations, there is room for improvement in ranking search results and in delivering other forms of content.

SUMMARY

According to one aspect of the disclosure, disclosed is a method of providing a prioritized list of items available via an electronic user device to a user. The user has relations categorized in a social graph for which activity is crawled to detect interactive behavior with objects made by the relations via respective electronic devices. The method includes identifying items for the list; determining a relative level of the user's contextual affinity with one or more of the list items, contextual affinity to a list item characterized by connectedness of a context of the user's current use of the electronic user device to a manner in which a relation has had interactive behavior with one of the objects that corresponds to the list item; and ranking the list items according to the relative levels of affinity.

According to an embodiment of the method, the list items are search results for a user-defined search query, the search results having relative priority based on at least a number of inbound links to each search result.

According to an embodiment of the method, ranking the list items according to the relative levels of affinity includes assigning a first weighting factor to the level of affinity and a second weighting factor to the priority based on relative number of inbound links, and the ranking based on a combination of the weighted level of affinity and the weighted priority based on relative number of inbound links.

According to an embodiment of the method, the list items are media content items or media content suggestions.

According to an embodiment of the method, context of the user's current use of the electronic user device is defined by one or more of a type of the electronic user device, a location of the user, and an activity in which the user is engaged in addition to using the electronic user device.

According to an embodiment, the method further includes crawling the electronic device activity of relations in the user's social graph to construct a multi-dimensional object matrix containing value-based indications of multiple types of interactive behavior with the objects.

According to an embodiment of the method, the relations are classified in two or more relation type categories representing different context roles in which the user engages at different times.

According to another aspect of the disclosure, a computing system is configured to provide a prioritized list of items available via an electronic user device to a user. The user has relations categorized in a social graph for which activity is crawled to detect interactive behavior with objects made by the relations via respective electronic devices. The computing system includes a memory that stores a software-based ranking function comprised of executable instructions; and a processor that executes the executable instructions and by execution of the executable instructions, the computer system: identifies items for the list; determines a relative level of the user's contextual affinity with one or more of the list items, contextual affinity to a list item characterized by connectedness of a context of the user's current use of the electronic user device to a manner in which a relation has had interactive behavior with one of the objects that corresponds to the list item; and ranks the list items according to the relative levels of affinity.

According to an embodiment of the computing system, the list items are search results for a user-defined search query, the search results having relative priority based on at least a number of inbound links to each search result.

According to an embodiment of the computing system, ranking the list items according to the relative levels of affinity includes assigning a first weighting factor to the level of affinity and a second weighting factor to the priority based on relative number of inbound links, and the ranking based on a combination of the weighted level of affinity and the weighted priority based on relative number of inbound links.

According to an embodiment of the computing system, the list items are media content items or media content suggestions.

According to an embodiment of the computing system, context of the user's current use of the electronic user device is defined by one or more of a type of the electronic user device, a location of the user, and an activity in which the user is engaged in addition to using the electronic user device.

According to an embodiment of the computing system, by execution of the executable instructions the computing system further crawls the electronic device activity of relations in the user's social graph to construct a multi-dimensional object matrix containing value-based indications of multiple types of interactive behavior with the objects.

According to an embodiment of the computing system, the relations are classified in two or more relation type categories representing different context roles in which the user engages at different times.

According to another aspect of the disclosure, a non-transitory computer readable medium storing executable instructions that when executed by a computing system causes the computing system to provide a prioritized list of items available via an electronic user device to a user. The user has relations categorized in a social graph for which activity is crawled to detect interactive behavior with objects made by the relations via respective electronic devices. The logical instructions identify items for the list; determine a relative level of the user's contextual affinity with one or more of the list items, contextual affinity to a list item characterized by connectedness of a context of the user's current use of the electronic user device to a manner in which a relation has had interactive behavior with one of the objects that corresponds to the list item; and rank the list items according to the relative levels of affinity.

According to an embodiment of the non-transitory computer readable medium, the list items are search results for a user-defined search query, the search results having relative priority based on at least a number of inbound links to each search result.

According to an embodiment of the non-transitory computer readable medium, ranking the list items according to the relative levels of affinity includes assigning a first weighting factor to the level of affinity and a second weighting factor to the priority based on relative number of inbound links, and the ranking based on a combination of the weighted level of affinity and the weighted priority based on relative number of inbound links.

According to an embodiment of the non-transitory computer readable medium, the list items are media content items or media content suggestions.

According to an embodiment of the non-transitory computer readable medium, context of the user's current use of the electronic user device is defined by one or more of a type of the electronic user device, a location of the user, and an activity in which the user is engaged in addition to using the electronic user device.

According to an embodiment of the non-transitory computer readable medium, the logical instructions crawl the electronic device activity of relations in the user's social graph to construct a multi-dimensional object matrix containing value-based indications of multiple types of interactive behavior with the objects.

DETAILED DESCRIPTION OF EMBODIMENTS

Figure 1:
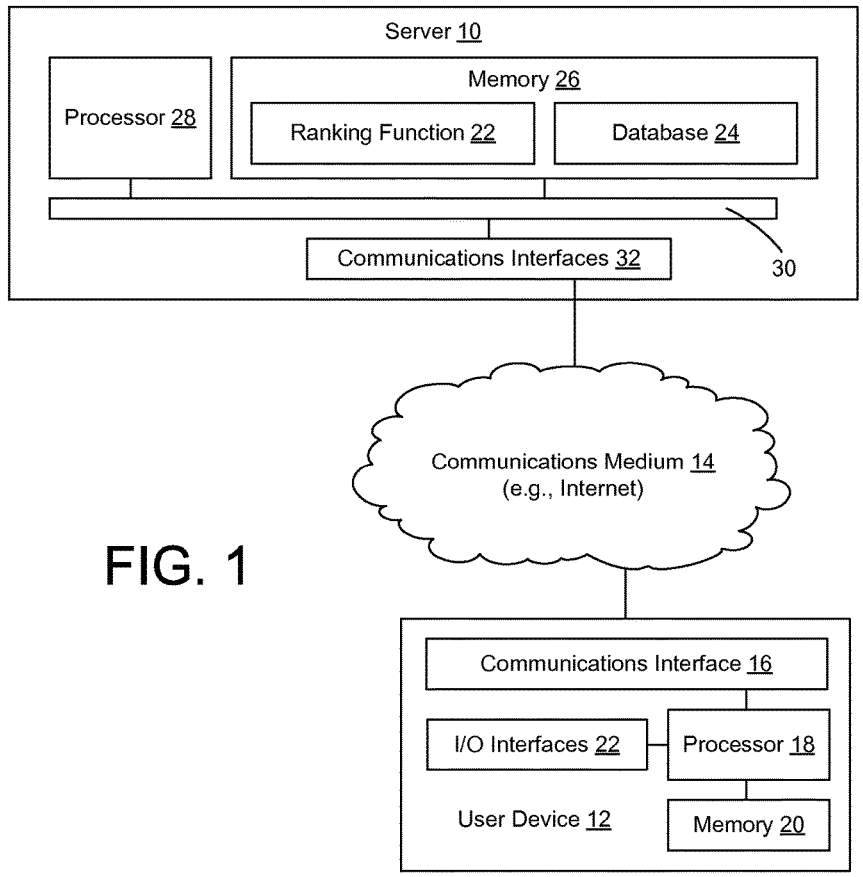
FIG. 1 is a schematic diagram of a system for ranking search results and enhancing the relevancy of content that is delivered to a user.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

INTRODUCTION

Described below in conjunction with the appended figures are various embodiments of systems and methods for ranking search results and enhancing the relevancy of content that is delivered to a user. The disclosed techniques are primarily described in the context of returning Internet search results to a user. But the techniques may be applied in other contexts, such as returning search results for searches of other networks, databases or systems. Other exemplary contexts in which the disclosed techniques may be applied include delivering advertisements to the user, delivering content suggestions for music, videos, games and other content to the user, and delivering bookmark suggestions to the user.

The techniques involve ranking search results (e.g., search results initially ranked based on inbound links) using data derived from crawling the user's social graph. This may increase or decrease the rank of search results according to objects appearing in the user's social graph and actions taken with respect to those objects by respective ones of the user's friends, family and peers. In addition, the contextual information relating to the user at the time of the search is used to weight the application of data that is applied to the search results. In this manner, the weight of an object from the user's social graph that has relevancy to the search will go up or down depending on the present context of the user at the time of the search.

System Architecture

FIG. 1 is a schematic diagram of an exemplary system for implementing the disclosed techniques. It will be appreciated that the illustrated system is representative and other systems may be used to implement the disclosed techniques. Also, functions disclosed as being carried out by a single device, such as the disclosed server, may be carried out in a distributed manner across nodes of a computing environment. In other embodiments, at least some of the disclosed operations may be carry out by the user device.

The system includes a server 10 that is in operative communication with a user device 12. The server 10 also may be in operative communication with other devices operated by the same user as the user device 10 and/or may be may be in operative communication with other devices operated by other users. The user device 12 may be one of a variety of types of devices, such as a mobile phone, a tablet computer, a laptop computer, a desktop computer, a gaming device, etc. As will be described, the server 10 and the user device 12 are configured to carry out the respective logical functions that are described herein.

The server 10 communicates with the user device 12 over any appropriate communications medium 14, such as one or more of the Internet, a cellular or subscriber network, a WiFi network, etc. In addition to carrying out the operations described herein, the server 10 may carry out other support and service operations for the user device 12.

The user device 12 includes one or more communications interfaces 16 to allow for communications over various types of network connections and/or protocols. The communications interfaces may include, for example, one or more interfaces to communication cables and/or radio circuitry that includes one or more radio modems (e.g., radio transceivers) and corresponding antenna assemblies. Overall functionality of the user device 12 may be controlled by a control circuit that includes a processor 18. The processor 18 may execute code containing logical instructions that is stored in a memory 20. For instance, the processor 18 may be used to execute an operating system and other applications that are installed on the user device 12. The operating system or applications may include executable logic to implement the functions of the user device 12 that are described herein. One application that may be used for at least some of these functions is an Internet browser. The memory 20 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 20 includes a non-volatile memory for long term data storage and a volatile memory that functions as system memory. Data that is used or accessed by the user device 12 may be stored by the memory 20. The described operations that are carried out by the user device 12 may be thought of as a method that is carried out by the user device 12.

The user device may include other components including, without limitation, input/output (I/O) interfaces 22. The I/O interfaces may include a display for displaying information to a user, a touch input that overlays or is part of the display for touch screen functionality, one or more buttons, motion sensors (e.g., gyro sensors, accelerometers), a speaker, a microphone, etc. Other components may include a rechargeable battery-based power supply, a camera, a position data receiver (e.g., a global positioning system (GPS) receiver), a subscriber identity module (SIM) card slot in which a SIM card is received, etc.

The server 10 may be implemented as a computer-based system that is capable of executing computer applications (e.g., software programs), including a ranking function 22 that, when executed, carries out functions of the server 10 that are described herein. The ranking function 22 and a database 24 may be stored on a non-transitory computer readable medium, such as a memory 26. The database 24 may be used to store various information sets used to carry out the functions described in this disclosure. For instance, the server 10 may store and access a social graph for a user of the user device 12. The memory 26 may be a magnetic, optical or electronic storage device (e.g., hard disk, optical disk, flash memory, etc.), and may comprise several devices, including volatile and non-volatile memory components. Accordingly, the memory 26 may include, for example, random access memory (RAM) for acting as system memory, read-only memory (ROM), solid-state drives, hard disks, optical disks (e.g., CDs and DVDs), flash devices and/or other memory components, plus associated drives, players and/or readers for the memory devices.

To execute logical operations, the server 10 may include one or more processors 28 used to execute instructions that carry out logic routines. The processor 28 and the memory 26 may be coupled using a local interface 30. The local interface 30 may be, for example, a data bus with accompanying control bus, a network, or other subsystem.

The server 10 may have various input/output (I/O) interfaces for operatively connecting to various peripheral devices, as well as one or more communications interfaces 32. The communications interface 32 may include for example, a modem and/or a network interface card. The communications interface 32 may enable the server 10 to send and receive data signals to and from other computing devices via an external network. In particular, the communications interface 32 may operatively connect the server 10 to the communications medium 14.

Figure 2:
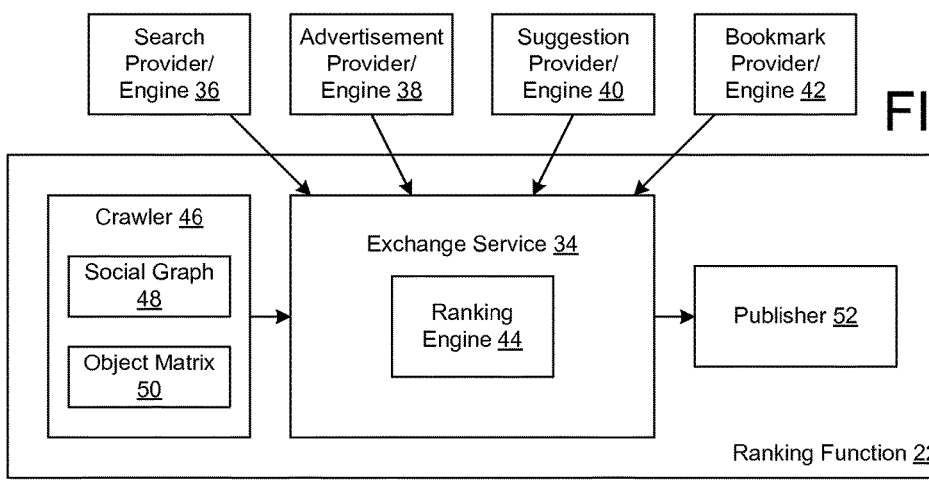
FIG. 2 is a schematic diagram of a software-implemented ranking function.

With additional reference to FIG. 2, representative components of the ranking function 22 are illustrated. The ranking function 22 includes an exchange service 34 that receives input from one or more data sources. For instance, the exchange serve 34 may receive Internet or database search results from a search provider or search engine 36. In other embodiments, content other than search results may be received. Exemplary content other than search results may include advertisements from an advertisement provider or advertisement engine 38, suggestions of content to consume (e.g., music, music videos, videos, movies, TV shows, games, books, articles, podcasts, etc.) from a suggestion provider or suggestion engine 40, or bookmarks to direct the user to various webpages or content to consume from a bookmark provider or bookmark engine 42.

The exchange service 34 includes a ranking engine 44 that applies a set of ranking rules to the search results or other content to rank or prioritize the search results or other content for presentation to the user. During application of the ranking rules, data gathered from relations of the user are applied. Relations are persons that have some relationship to the user. Exemplary relations may be, but are not limited to, one or more of social media friends, family members, or peers. Peers may be persons such as coworkers if the user is employed at an organization, contemporaries at organizations different than the organization at which the user works, classmates or teachers if the user is a student, etc. Relations may be identified using social media associations (e.g., from social media services such as, but not limited to, FACEBOOK and LINKEDIN), persons appearing in a contact database of the user, persons appearing in a gaming community to which the user belongs, or persons identified as having an association with the user in another manner.

The data used by the ranking engine 44 is collected by a crawler 46. The crawler 46 generates and maintains a social graph 48 for the user. The social graph 48 will be described in greater detail. Briefly, the social graph includes the identified relations of the user and objects associated with each relation. The objects are identifiable items that are of interest in building a database of searchable content (e.g., the objects may have relationship to possible search query terms). Therefore, objects may be, but are not limited to, websites, webpages, pictures, music files (e.g., songs), videos, TV shows, movies, books, articles, games, podcasts and links to any of the foregoing.

The crawler 46 may further generate and store data on how the relations interact with the objects in an object matrix 50. The interaction information for an object may include data regarding various aspects of behavior related to the object, such as actions taken out in a controlled manner through an open or closed website or network. Examples of these actions include, but are not limited to, using (e.g., accessing or consuming) the object, the number of times the person sets a link to the object, the frequency of use of the object, the posting of content via or at the object, the bookmarking of the object, the "liking" of the object or the "liking" of content available via the object, or other interactive behavior with the object. For purposes of this disclosure, "liking" an object or content is the act of giving positive feedback for the object or content.

Once the ranking engine 44 applies the set of ranking rules to the search results or other content to rank or prioritize the search results or other content, a publisher 52 outputs the ranked or prioritized search results or other content to the user device 12 for display and/or consumption.

Social Graph

Figure 3:
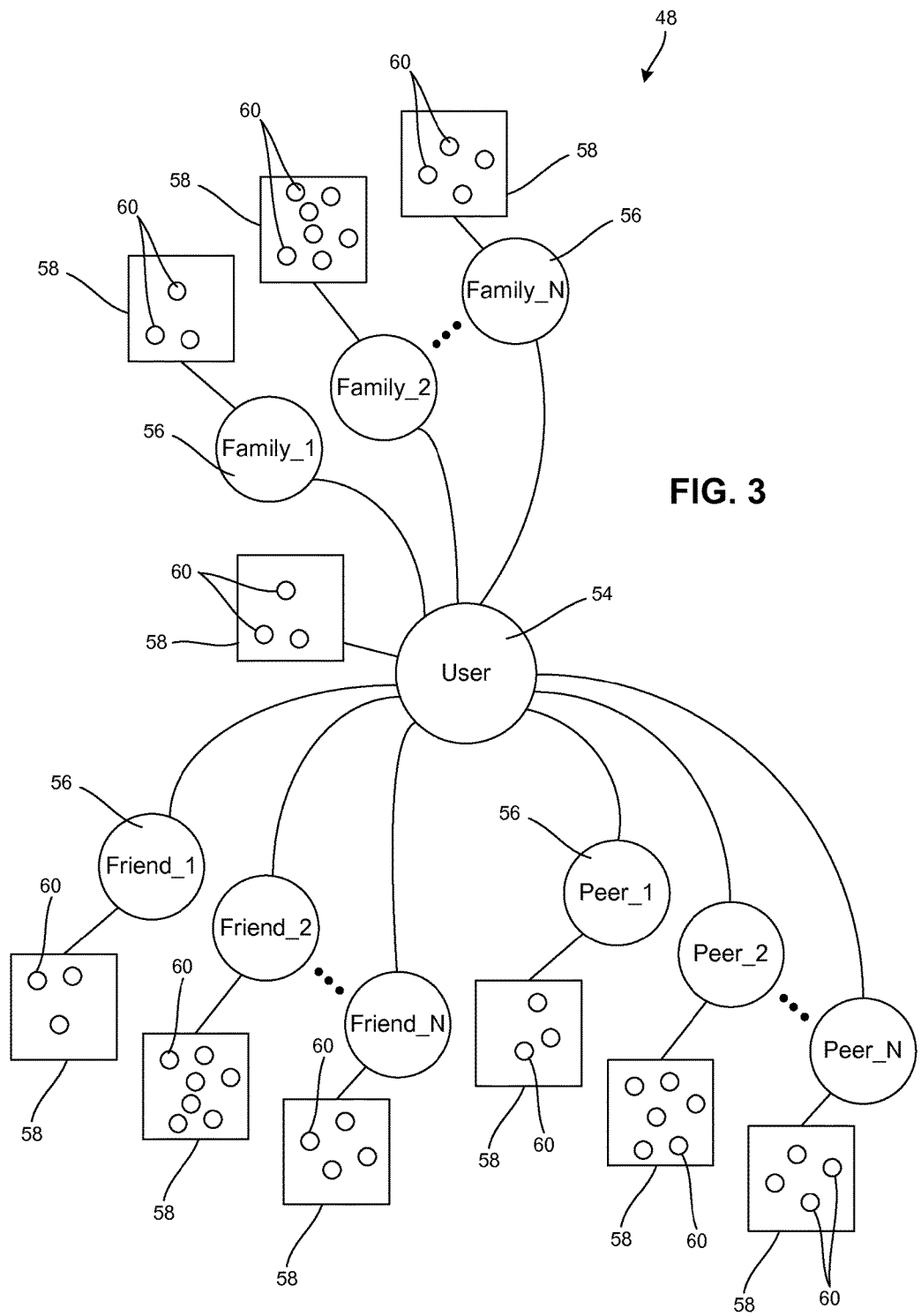
FIG. 3 is a schematic diagram of a social graph used by the ranking function.

With additional reference to FIG. 3, illustrated is an exemplary social graph 48 for a user 54 of the user device 12. The social graph 48 contains an identification of relations 56 of the user 54. The relations 56 may be group by type of relationship to the user. In the illustrated embodiment, the types of relationships into which the relations 56 are grouped include social media friends, family members (e.g., relatives of the user), and peers of the user. It is possible that a person may fall within two or more relationship types. In this case, the person may appear in each matching relationship type in the social chart or may be categorized into the type with which the person has the strongest connection.

Social media friends are identified in the illustrated social graph as Friend_1 through Friend_N. Similarly, familial relations are identified in the illustrated social graph as Family_1 through Family_N and peers are identified in the illustrated social graph as Peer_1 through Peer_N.

Each relation 56 is associated with an object set 58 that is unique to the relation. Each object set 58 contains one or more objects 60. The user 54 is also associated with an object set 58 that contains one or more objects 60. As indicated, the objects 60 are identifiable items that are of interest in building a database of searchable content such as websites, webpages, pictures, music files (e.g., songs), videos, TV shows, movies, books, articles, games, podcasts, and links to any of the foregoing. The objects 60 for each relation may be identified by the crawler 46 based on activity of the relation when using one or more electronic devices associated with the relation. The activity may include Internet usage, content consumption, interactions made on one or more social media sites, etc. In one embodiment, each relation may be given the opportunity to provide consent to the collection of information for the social graph 48.

Figure 4:
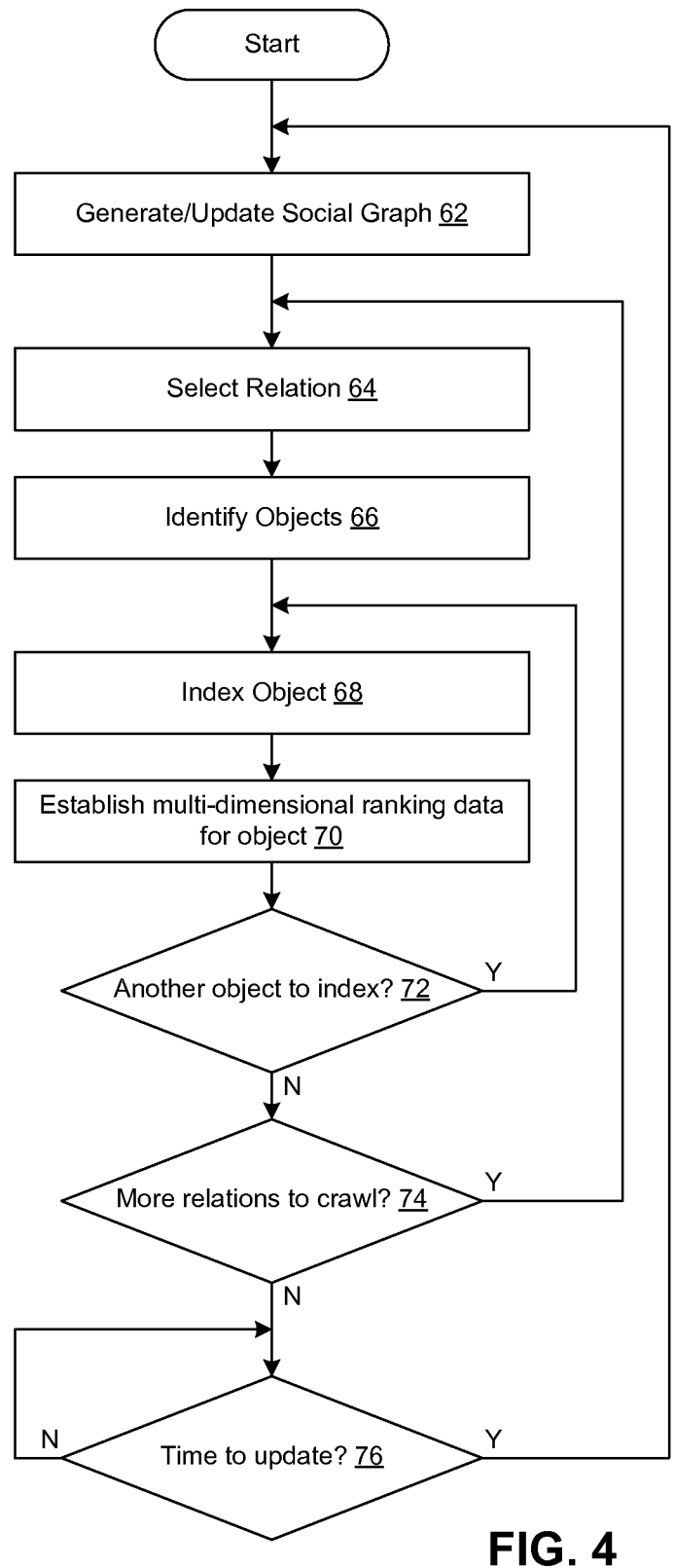
FIG. 4 is a flow-diagram of a crawling operation of the ranking function.

With additional reference to FIG. 4, the generation and maintenance of the social graph 48 will be described in greater detail. FIG. 4 illustrates an exemplary flow diagram representing steps that may be carried out by the server 10 when executing the logical instructions of the crawler 46. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 62 where the crawler generates the social graph 48 for the user 54. In subsequent iterations, the social graph 48 is updated with any changes in relations 56 and/or any changes in objects 60 and data relating to the way relations interact with the objects 60.

Generating the social graph 48 in block 62 may include identifying and classifying the relations 56 of the user 54 to build a logical tree-like structure of relations 56 relative to the user 54. Next, in block 64, a relation 56 is selected to identify and process objects 60 associated with the relation 56. In block 66, the crawler 46 builds the object set 58 for the relation 56 by crawling Internet usage and related logs, content consumption and related logs, and other interactions that the relation 56 has with electronics devices. A selected one of the identified objects 60 is indexed in block 68. For example, the object 60 is logged into the object matrix 50 (FIG. 2) for the user 54.

In block 70, a profile of interaction by the relation 56 with the object 60 that is indexed in block 68 is established. The profile may be in the form of multi-dimensional ranking data, also referred to as interaction information. The multi-dimensional ranking data includes information that may be used to give relative value to objects when ranking search results or prioritizing other content and includes data regarding various aspects of behavior related to the object. Examples of interactive behavior that a relation 56 may make with an object 60 (e.g., the dimensions in the multi-dimensional object matrix 50) include, but are not limited to, using (e.g., accessing or consuming) the object 60, the number of times the person sets a link to the object 60 (e.g., sets an inbound link at a website unrelated to the object 60), the frequency of use of the object 60, the posting of comments or content at the object 60, the bookmarking of the object 60 (adding an object to a favorites list may be considered an act of bookmarking, which implies that the object has high importance to the relation), the liking of the object 60 or the liking of content available via the object 60, the sharing of the object 60 or the sharing of content available via the object 60, the number of clicks or views the relation makes at the object 60, or other interactive behavior with the object.

As an example, Friend_1 may visit a website (e.g., Website_1) on a weekly basis. In this case, Website_1 is the object and interactive data includes the frequency of use. Friend_1 may be observed to like content posted on Website_1 about once every four visits (e.g., a like rate of about twenty-five percent). Another metric that may be measured for an object is the frequency with which the object contains content (e.g., articles, blog postings, etc.) that appear in the relation's search terms or suggestions. In the example of Friend_1, for instance, Website_1 may contain articles that show up in Friend_1's search terms and suggestions on average two times per day. Friend_2, on the other hand, might access a different website (Website_2) with a different interaction profile than Friend_1 had with Website_1. For instance, Friend_2 may have bookmarked Website_2, visits Website_2 at a frequency of about twice a week, and likes content on Website_2 about fifteen percent of the visits, and Website_2 may contain articles that show up in Friend_2's search terms and suggestions on average three times per day.

Although certain types of interactive behavior are mentioned as being possible contributors to the multi-dimensional ranking data, it will be appreciated that the mentioned items are representative and other interactive behavior may be form part of the data. The interactive data that is collected also may depend on the type of object (e.g., website, article, blog post, video, etc.). Also, additional information may be collected, such as time of day the an object 60 is accessed (e.g., during work hours or in the evening), day of the week the object 60 is accessed (e.g., during the week or on the weekend), physical proximity to the user 54 at the time the object 60 is accessed, and the device from which the object is accessed (e.g., a mobile device, a work computer, a home computer, a smart television, etc.).

Other collected data used in ranking search results may include number of inbound links to the object, metadata describing the object that may be used to classify the relevancy of the object to a search query, and time when the object was visited, updated, used or consumed on the premise that old content is considered less relevant than newer, fresher content.

In block 72, a determination is made as to whether there are additional objects to index. If so, the logical flow may return to block 68. If not, the logical flow may proceed to block 74. In block 74, a determination is made as to whether there are additional relations to crawl. If so, the logical flow may return to block 64. If not, the logical flow may proceed to block 76. In block 76, a determination is made as to whether the social graph 48 for the user 54 should be updated. For instance, an update may be made on a daily or weekly basis. If it is not time to update the social graph 48, the logical flow may be placed in an idle state. If it is time to update the social graph 48, the logical flow may return to block 62. In other embodiments, the crawler 46 may act continuously to identify new or changed relations and identify new or changed objects and related data.

Search Result Ranking

Figure 5:
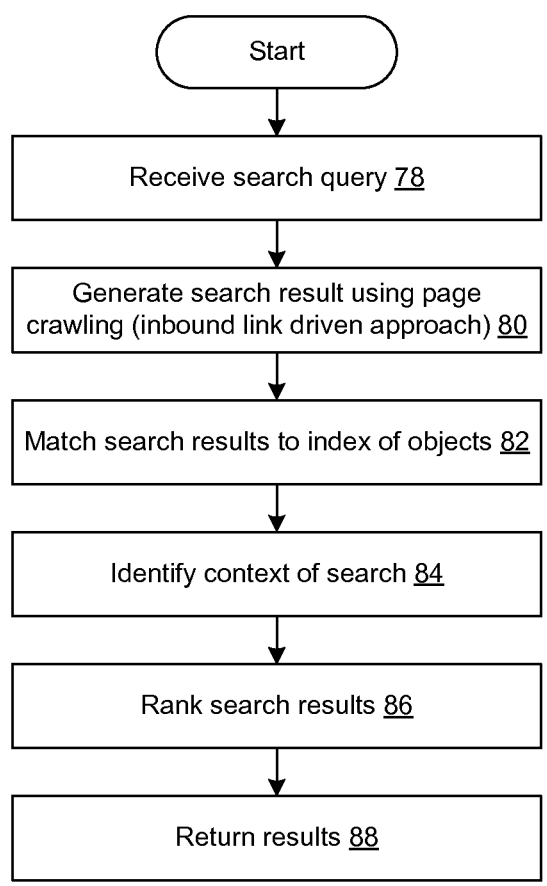
FIG. 5 is a flow-diagram of ranking search results with the ranking function.

With additional reference to FIG. 5, the generation and ranking of Internet or database search results will be described in greater detail. FIG. 5 illustrates an exemplary flow diagram representing steps that may be carried out by the server 10, some of which may be carried out by executing the logical instructions of the ranking engine 44. Although illustrated in a logical progression, the illustrated blocks may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 78 where a search query is received from the user of the user device 12. Typically, the search query is text-based (e.g., a string of one or more words), but the search query may take other forms. In one embodiment, the search query is forwarded to the search engine 36. In block 80, the search engine 36 performs a search using the search query and returns search results, such as links to webpages. In case of an Internet search, for example, the search may be made using a page crawling approach where the returned search results are ranked using inbound links to the webpages. In one embodiment, the search may be carried out by a commercially available search engine such, such as GOOGLE.

The returned search results may be re-ranked by the ranking engine 44. As part of the re-ranking, and in block 82, the logical flow may include matching the search results to the objects 60 that are indexed as part of the user's social graph 48. The matching identifies the search results that also appear in the object matrix 50. Objects 60 that are not in the search results but that have correspondence to the search query (e.g., as indicated by the object's metadata) may be added to the search results. In one embodiment, if there are no matches or very few matches (e.g., three or less) between the search results and the objects 60, the logic flow may end and the search results from block 80 may be returned to the user. In another embodiment, the general search of block 80 may be omitted and the search results may be derived by matching the search query to the objects 60 in the object matrix 50.

The logical flow also may identify the context of the user's search query in block 84. Context of the user's search query is a construct of one or more conditions that are present at the time that the search query is made that are indicative of the types of search results in which the user may be interested, such as search results that are biased toward news stories, popular culture, academic information, information relevant to the user's job, etc. An exemplary condition that may form part of the context may be location of the user device 12, such as whether the search query was made from the user's place of work if the user is employed, the user's school if the user is a student, the user's home, the residence of a relation 56, a public location, etc. The location may be used as an indication of the user's role at the time that the search was made. Another exemplary condition that may form part of the context may be the type of user device 12 from which the search query is made, such as mobile phone, tablet computer, laptop computer, desktop computer, gaming console, etc. Another exemplary condition that may form part of the context may be an activity in which the user is engaged, such as walking in a park or in a city, watching television, working or studying, cooking, shopping, etc.

In block 86, the search results from block 80 are ranked using information from blocks 82 and 84 and information from the object matrix 50. The ranking of block 86 is configured to introduce an element of affinity in the ranking process. Affinity may be found in the connectedness of one or more relation's interaction with an object that corresponds to a search result. Alternatively and/or additionally, affinity may be found in the connectedness of the context of the user to the manner in which a relation 56 has interaction with an object that corresponds to a search result. Connectedness is measured by the quality and number of associations that can be determined between two compared constructs (e.g., the relation's electronic interaction with an object and a search result or the user's context and the manner in which a relation 56 has electronic interaction with an object). In implementation, connectedness and level of affinity may be ascertained using artificial intelligence or a weighting algorithm that weights and combines each identified association between compared constructs. In this regard, the various dimensions from the object matrix may each be assigned a weight when determining the level of affinity.

The higher the level of affinity, the higher the search result may be ranked in the ranking of block 86. Affinity may be weighted and applied with other weighted ranking factors to rank the search results. Another exemplary ranking factor is the relative number of inbound links to a search result as indicated by the ranking of the search result at block 80.

In this manner, the ranking of the search results is influenced by the user's social graph. This is done under the premise that objects that the user's relations have an interest in will also be of interest to the user and should be ranked higher in a return of search results to a user search query. But the re-ranking approach need not supplant the original ranking Rather, maintaining relative number of inbound links and/or other factors in the ranking process allows for multiple contributors to inform the ranking of search results. The ranking engine 44 may be configured to dynamically select weights applied to each of the ranking factors depending on level of affinity, relative strength of relevance as indicated by number of inbound links, and strength of any other ranking factor that is applied.

In one embodiment, the connections of the relations 56 to the search results may not be given equal weighting. For instance, a level of engagement with an object 60 that matches a search result may be converted to a weight that is applied in the ranking process (e.g., the higher the level of engagement with an object 60, the higher the weight given to the matching search result, and vice versa). For example, using the above described example of Friend_1's level of engagement with Website_1 and Friend_2's level of engagement with Website_2, it may be determined that Friend_2 has a higher level of engagement with Website_2 than Friend_1 has with Website_1. Therefore, if both Website_1 and Website_2 are in the search results, those websites may be ranked high in the output of block 86 with Website_2 outranking Website_1.

In addition, the context of the user at the time of the search may be used to weight a relation's connection to an object 60 that matches a search result. For instance, using the foregoing example, if it is found that the user's search was performed while in a work role, the weights applied to Website_1 and Website_2 might be lower than the weight applied to a third website that matches a search result and with which a peer relation interacts. Conversely, if the user is found to be in a social situation, the objects associated with friends may be weighted higher than the object associated with peers.

The ranking of search results resulting from block 84 is not static over time. Rather, the context of the user and the activity of relations 56 will have a direct influence on the ranking of search results. For instance, a search query performed while the user is at work will have a different ranking of search results than the same search query performed an hour later when the user is at home and interacting with family members. This may be true even if the search results for the two instances of the search query are ranked in the same manner in block 80. Thus, the ranking of search results may be considered dynamic based on the user's social context since the weighting applied to ranking factors for objects and search results will be different for different contexts of the user. A noticeable result to the user is that what the user is doing at the time of the search may change the ranking of search results to reflect the dynamic nature of the user's day-to-day activities.

Once the search results are ranked in block 86 and ready for presentation to the user, the search results are published by the publisher 52 in block 88, including communicating the ranked search results to the user device 12.

OTHER APPLICATIONS

As indicated, affinity information derived from the social graph 48 may be applied in other contexts and situations. In one exemplary application, affinity is used to increase the relevancy of advertisements that are delivered to the user. For instance, an advertisement for a product or service that corresponds to an object from the social graph 48 that, in turn, has high contextual affinity to the user may be selected for presentation to the user.

In another exemplary application, content suggestions or content delivered over streaming service is prioritized using affinity information derived from the social graph 48. In this way, the content identified to be of interest to relations of the user may be suggested or delivered to the user. As an example, if the user is jogging while listening to a streaming music service, the songs that are delivered to the user may be selected based on songs that the user's relations listed to while engaged in similar activities, such as jogging, skiing, using training equipment at a gym, etc. In similar manner, bookmarks may be selected according to affinity information derived from the social graph 48.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of providing a prioritized list of items available via an electronic user device to a user, comprising:
    identifying, by one or more processors having access to a memory, a plurality of relations of the user;
    classifying, by the one or more processors, each of the plurality of relations of the user into at least one of a plurality of classifications in a social graph;
    for each of the plurality of relations of the user, identifying, by the one or more processors, a set of objects associated with a relation of the user, wherein the set of objects is identified based on interactions that the relation has with an electronic device; and
    indexing, by the one or more processors, each of the identified objects in a multidimensional object matrix stored in the memory;
    generating, by the one or more processors and for an object in the set of objects, multidimensional ranking data, wherein each dimension of the multidimensional ranking data is based on a different manner in which a relation has had interactive behavior with the object;
    indexing, by the one or more processors, each dimension of the multidimensional ranking data in the multidimensional object matrix, wherein the indexing associates each dimension of the multidimensional ranking data with the object;
    identifying, by the one or more processors, items for the list, wherein the list items are search results for a user-defined search query, the search results having relative priority based on at least a number of inbound links to each search result;
    determining, by the one or more processors, a relative level of the user's contextual affinity with one or more of the list items, contextual affinity to a list item characterized by connectedness of a context of the user's current use of the electronic user device to a dimension of the multidimensional ranking data associated with the object when the object corresponds to the list item; and
    ranking, by the one or more processors, the list items according to the relative levels of affinity, wherein ranking the list items according to the relative levels of affinity includes assiqninq a first weiqhtinq factor to the relative level of affinity and a second weighting factor to the relative priority based on the number of inbound links, and wherein the ranking is based on a combination of the weighted level of affinity and the weighted priority based on the number of inbound links.

2. The method of claim 1, wherein the list items include media content items or media content suggestions.

3. The method of claim 1, wherein context of the user's current use of the electronic user device is defined by one or more of a type of the electronic user device, a location of the user, and an activity in which the user is engaged in addition to using the electronic user device.

4. The method of claim 1, wherein the interactive behavior with the object is one or more of accessing or consuming the object, a number of times a link is set to the object, frequency of use of the object, and bookmarking of the object.

5. The method of claim 1, wherein the relations are classified in two or more relation type categories representing different context roles in which the user engages at different times.

6. A computing system configured to provide a prioritized list of items available via an electronic user device to a user, the computing system comprising:
    a memory that stores a software-based ranking function comprised of executable instructions and a multidimensional object matrix; and
    a processor that executes the executable instructions and by execution of the executable instructions, the computer system:
    identifies a plurality of relations of the user;
    classifies each of the plurality of relations of the user into at least one of a plurality of classifications in a social graph;

identifies, for each of the plurality of relations of the user, a set of objects associated with a relation of the user, wherein the set of objects is identified based on interactions that the relation has with an electronic device; and indexes each of the identified objects in a multidimensional object matrix stored in the memory;

generates, for an object in the set of objects, multidimensional ranking data, wherein each dimension of the multidimensional ranking data is based on a different manner in which a relation has had interactive behavior with the object;

indexes each dimension of the multidimensional ranking data in the multidimensional object matrix, wherein the indexing associates each dimension of the multidimensional ranking data with the object;

identifies items for the list, wherein the list items are search results for a user-defined search query, the search results having relative priority based on at least a number of inbound links to each search result;

determines a relative level of the user's contextual affinity with one or more of the list items, contextual affinity to a list item characterized by connectedness of a context of the user's current use of the electronic user device to a dimension of the multidimensional ranking data associated with the object when the object corresponds to the list item; and ranks the list items according to the relative levels of affinity, wherein ranking the list items according to the relative levels of affinity includes assigning a first weighting factor to the relative level of affinity and a second weighting factor to the relative priority based on the number of inbound links, and wherein the ranking is based on a combination of the weighted level of affinity and the weighted priority based on the number of inbound links.

7. The computing system of claim 6, wherein the list items include media content items or media content suggestions.

8. The computing system of claim 6, wherein context of the user's current use of the electronic user device is defined by one or more of a type of the electronic user device, a location of the user, and an activity in which the user is engaged in addition to using the electronic user device.

9. The computing system of claim 6, wherein the interactive behavior with the object is one or more of accessing or consuming the object, a number of times a link is set to the object, frequency of use of the object, and bookmarking of the object.

10. The computing system of claim 6, wherein the relations are classified in two or more relation type categories representing different context roles in which the user engages at different times.

11. A non-transitory computer readable storage medium storing executable instructions for providing a prioritized list of items available via an electronic user device to a user, which executable instructions, when executed by a computing system, cause the computing system to:

identify a plurality of relations of the user;

classify each of the plurality of relations of the user into at least one of a plurality of classifications in a social graph;

identify, for each of the plurality of relations of the user, a set of objects associated with a relation of the user, wherein the set of objects is identified based on interactions that the relation has with an electronic device;

index each of the identified objects in a multidimensional object matrix stored in a memory accessible to the computing system;

generate, for an object in the set of objects, multidimensional ranking data, wherein each dimension of the multidimensional ranking data is based on a different manner in which a relation has had interactive behavior with the object;

index each dimension of the multidimensional ranking data in the multidimensional object matrix, wherein the indexing associates each dimension of the multidimensional ranking data with the object;

identify items for the list, wherein the list items are search results for a user-defined search query, the search results having relative priority based on at least a number of inbound links to each search result;

determine a relative level of the user's contextual affinity with one or more of the list items, contextual affinity to a list item characterized by connectedness of a context of the user's current use of the electronic user device to a dimension of the multidimensional ranking data associated with the object when the object corresponds to the list item; and rank the list items according to the relative levels of affinity, wherein ranking the list items according to the relative levels of affinity includes assigning a first weighting factor to the relative level of affinity and a second weighting factor to the relative priority based on the number of inbound links, and wherein the ranking is based on a combination of the weighted level of affinity and the weighted priority based on the number of inbound links.

12. The non-transitory computer readable medium of claim 11, wherein the list items include media content items or media content suggestions.

13. The non-transitory computer readable medium of claim 11, wherein context of the user's current use of the electronic user device is defined by one or more of a type of the electronic user device, a location of the user, and an activity in which the user is engaged in addition to using the electronic user device.

14. The non-transitory computer readable medium of claim 11, wherein the interactive behavior with the object is one or more of accessing or consuming the object, a number of times a link is set to the object, frequency of use of the object, and bookmarking of the object.

15. The non-transitory computer readable medium of claim 11, wherein the relations are classified in two or more relation type categories representing different context roles in which the user engages at different times.

* * * * *